United States Patent [19]

Baisden

[11] Patent Number: 4,816,274

[45] Date of Patent: Mar. 28, 1989

[54] METHOD OF EXTRACTING LIPIDS FROM FOODSUFFS

[76] Inventor: C. Robert Baisden, 3227 Ramsgate Rd., Augusta, Ga. 30909

[21] Appl. No.: 209,303

[22] Filed: Jun. 21, 1988

Related U.S. Application Data

[63] Continuation-in-part of Ser. No. 016,064, Feb. 18, 1987, abandoned.

[51] Int. Cl.$^4$ .............................................. A23L 1/216
[52] U.S. Cl. ...................................... 426/417; 426/637
[58] Field of Search ....................... 426/417, 486, 637

[56] References Cited

U.S. PATENT DOCUMENTS 4,269,861  5/1981  Caridis et al. ................... 426/637 X

*Primary Examiner*—Donald E. Czaja
*Assistant Examiner*—Celine T. Callahan
*Attorney, Agent, or Firm*—Morton J. Rosenberg

[57] ABSTRACT

A method of extracting lipids or fats from previously oil fried foodstuffs includes the placement of at least partially cooked foodstuffs (10) on a base surface (14) and impinging such with heated air. The heated air is non-recirculating and is exhausted through an exhaust system (20) to an external environment. The non-recirculating air contacting the foodstuff (10) is maintained substantially moisture-free and is at a predetermined temperature within the approximate range of 350.0° F. to 450.0° F. By maintaining the heated air above the boiling point of lipids contained within and on the surface of the foodstuff (10), excess fats and lipids are vaporized by impingment of the substantially moisture-free heated air.

17 Claims, 1 Drawing Sheet

U.S. Patent    Mar. 28, 1989    4,816,274
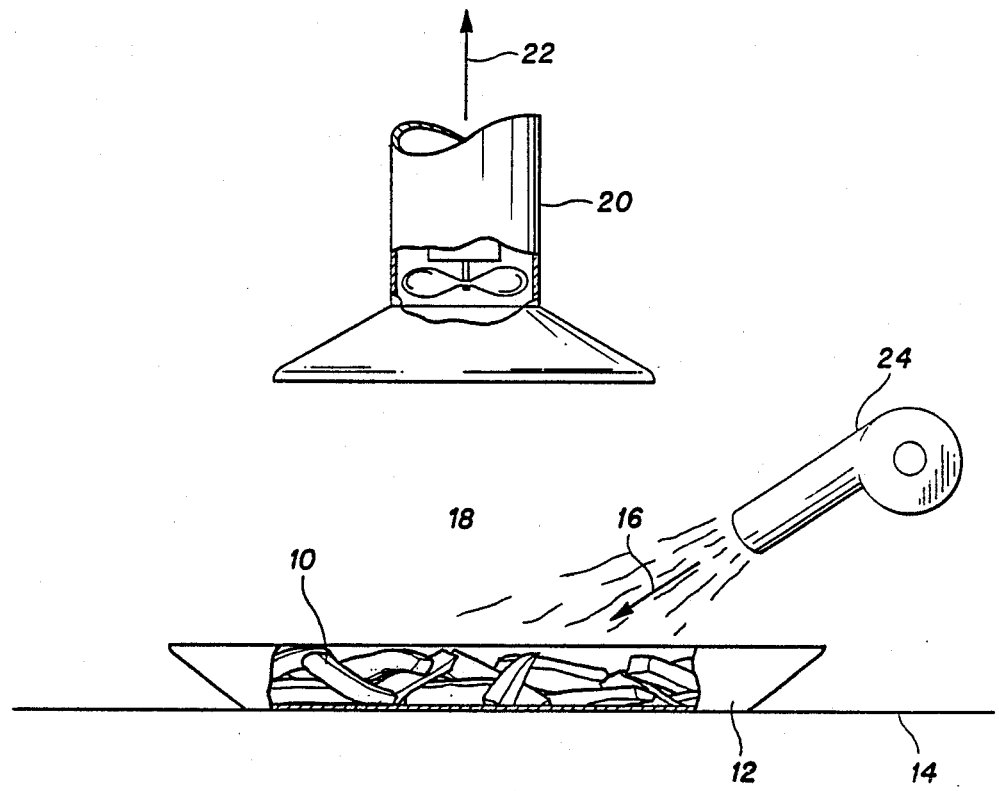

METHOD OF EXTRACTING LIPIDS FROM FOODSUFFS

RELATED REFERENCES

This invention is a continuation-in-part of U.S. patent application Ser. No. 016,064, filed Feb. 18, 1987, now abandoned.

BACKGROUND OF THE INVENTION

1. Field of the Invention

This invention is directed to a method of extracting lipids or fats from previously oil fried foodstuffs. In particular, this invention is directed to a method of extracting lipids or fats from foodstuffs which have initially been deep fried in fat or cooking oil, or blanched. More in particular, this invention is directed to a method of extracting lipids or fats from foodstuffs by impinging the foodstuffs with a stream of heated air as the final step in the cooking process. More in particular, this invention directs itself to impinging foodstuffs with a stream of non-recirculating air which is substantially moisture-free. Still further, this invention is directed to a method of removing lipids or fats from foodstuffs by impinging such foodstuffs with heated air in an open volume system at a predetermined temperature within the approximating range of 350.0° F. to 450.0° F. Still further, this invention relates to a method of maintaining crispness of initially prepared french fried potatoes by impinging at least partially cooked potato strips with a stream of heated air in the temperature range of 350.0° F. to 450.0° F. as the final step in the cooking process.

2. Prior Art

Methods directed to processes for preparing low fat content foodstuffs are known in the art. The best prior art known to Applicant includes U.S. Pat. Nos. 4,269,861; 4,238,517; 4,283,425; 4,160,039; 4,135,004; 4,109,020; 2,887,383; 4,254,153; 4,219,575; 3,925,563; 3,946,116; 1,993,607; 3,490,358; 2,004,775; 4,068,572; 3,472,156; and, 4,155,294.

In some prior art methods, processes for preparing low content potato chips are found, such as in U.S. Pat. No. 4,283,425 where a potato food is coated with an oil and then subjected to heating. However, such is a microwave heating type of condition and is not directed to the concept of impingement by non-recirculating hot air around the foodstuffs.

The other prior art such as U.S. Pat. No. 4,160,039, such directs itself to methods for preparing simulated deep fat fried foods where the food is coated with an oil and then baked in an oven. Such prior art does provide for coating with an oil and then having heated air applied thereto, however, such processes do not provide for rapid circulation of heated air as is necessary to the subject invention concept.

In other prior art processes such as U.S. Pat. No. 4,109,020, such are directed to methods of producing crisp re-heated french fried potatoes. Such processes do use a hot air oven to heat the foodstuff prior to deep fat frying to complete the cooking of the potatoes prior to the freezing process, however, they do not utilize impingement by heated air having a temperature greater than the boiling point of lipids subsequent to the initial frying process.

In still other prior art processes such as in U.S. Pat. No. 4,269,861, such are directed to the hot air treatment of previously fried french fried potatoes. However, the previous frying of the potatoes is not the finish frying, as the potatoes are only partially cooked, then exposed to the hot air process prior to freezing. Subsequent to freezing, the french fries are finish fried by the end user in the usual manner. Thus, although the french fires are frozen with a reduced moisture and lipid content, they regain an increase in lipid content during the final cooking process. While this prior art method may still produce a final cooked product with a lower lipid content than those produced by the other known prior art methods, it does not produce a final cooked product with a lower lipid content than that produced from the method of the instant invention. The non-recirculated hot air treatment provided as the final step in the cooking process produces a product with a significantly lower lipid content than that provided by any of the known prior art methods.

SUMMARY OF THE INVENTION

A method of extracting lipids from previously oil fried foodstuffs including the step of impinging the previously oil fried foodstuffs with a stream of heated air. Subsequent to the impingement of heated air, the heated air is removed from a volume space containing the foodstuffs subsequent to impingement.

BRIEF DESCRIPTION OF THE DRAWINGS

The FIGURE is a schematic representation of the method of extracting lipids or fats from foodstuffs showing foodstuffs mounted on a surface and being impinged by heated air.

DESCRIPTION OF THE PREFERRED EMBODIMENTS

Referring now to the FIGURE, there is shown a schematic representation directed to a method of extracting lipids or fats from previously oil fried foodstuffs. The method of the subject invention concept has been found to provide advantageous effects in the reduction of caloric values of foodstuffs which have previously been deep fat fried, oil fried, or blanched. Additionally, it has been found that the method of the subject concept advantageously maintains fried crispness over an extended period of time. The subject concept is directed in general to fried foodstuffs however, particular advantageous effects have been found in prolonging the crispness of french fried potatoes over an extended period of time.

Particularly, fast food chains provide french fried potatoes to their customers in conjunction with other foods being served. Generally, subsequent to the deep fat frying or oil frying of the french fried potatoes, such are placed in a serving pan prior to the sales to the customers. The french fried potatoes may have applied thereto a heat lamp to maintain the temperature, however, if such are not sold within five to ten minutes subsequent to removal from the frying process, such french fried potatoes are generally discarded by the retailer due to the fact that the potatoes become limp and lose their crispness. By incorporation of the subject invention concept method, the potatoes may be maintained over a prolonged period of time in substantially the same crisp state found immediately after removal from the frying process.

In the preparation of some fried foodstuffs, such are either fried or blanched and then frozen for subsequent sale. By application of the subject method concept as will be described in following paragraphs, a fried foodstuff having lowered caloric value and increased crispness has been produced.

Referring to the FIG, there is shown fried foodstuffs 10, inserted into pan 12 mounted on base surface 14. Previously oil fried foodstuffs 10 are impinged with a stream of heated air passing in direction 16. The heated air is removed from the open volume space 18 through exhaust fan 20 in direction 22 for explusion to an external environment. In this manner, there is a substantially continuous flow of heated air impinging the previously oil fried foodstuffs 10 with removal thereafter through exhaust system 20.

The step of impinging previously oil fried foodstuffs 10 with a stream of heated air is preceded by the step of frying, deep fat frying, or blanching foodstuffs 10 in either cooking oil or fat.

Air is heated and expelled from air gun 24 in direction 16 to impinge on foodstuffs 10 as is shown in the FIG. Air passing in direction 16 is heated to a temperature greater than the boiling point of the lipids, or fats contained within foodstuffs 10. Additionally, the heated air is maintained substantially moisture-free. The heated air is heated to some predetermined temperature within an approximating range of between 350.0° F. to 450.0° F. When foodstuffs 10 are french fried potatoes, a preferred range of heated air provides a predetermined impingement temperature within the approximating range 390.0° F.–410.0° F.

Although a number of hot air sources may be satisfactorily used, one which has been successfully used to demonstrate the inventive concept, is a Milwaukee Heat Tool Hot Air Gun, Model 750 operating at 14.0 amps. The temperature of the air leaving hot air gun 24 is approximately 400.0° F. and results in maintaining fried foodstuffs 10 and particularly french fried potatoes in a crisp state over an extended period of time. In general, the method of preparing previously fried foodstuffs 10 as herein described provides for a lower fat content by the use of forced hot air which brings about a substantially rapid evaporation of oils or other lipids contained on or near the surfaces of foodstuffs 10. The subject method has been found to markedly reduce the fat content of foodstuffs 10 and in particular french fried potatoes, by approximately 40 to 50 percent, since a large amount of fat is vaporized and carried away by the heated air.

In an embodiment of the method system, a popcorn popper was used to provide heated air to previously french fried potatoes. The french fried potatoes were suspended in a stream of heated air approximating 400.0° F. The temperature of the heated air was maintained within the approximating range 390.0° F.–410.0° F., and the resulting fried potatoes were found to be dry and crispy. Not all popcorn poppers are utilizable in this manner, and this concept directs itself to popcorn popper systems which provide for heat air in the range of 400.0° F. Particularly, popcorn popper Popaire 2 Model #511-3 produced by Hamilton-Beach has been found to provide highly crisp and dry final french fried potato products.

In general, and in broad concept, the method of extracting lipids or fats from previously fried foodstuffs 10 provides for the concept of blowing heated air into contact with foodstuffs 10 and then removing the heated air by maintaining foodstuffs 10 in an open volume space 18. Removal may be to the atmosphere or through exhaust system 10 for passage of non-recirculated hot air to the atmosphere.

In particular, the method concept as herein described, maintains crispness of initially prepared french fried potatoes wherein the raw potatoes are sliced and are at least partially cooked. At least partial cooking may be through deep fat frying, frying in cooking oil, or merely blanching such unprepared potato strips.

The potato strips are placed on base surface 14 in pan 12 or some container. The at least partially cooked potato strips 10 are then impinged with a stream of heated air in open volume air flow system 18 prior to removal of the heated air from the neighborhood of french fried potatoes 10.

The step of impinging fried potatoes 10 with the heated air includes the step of contacting potato strips 10 with a substantially continuous stream of heated air which is at a predetermined temperature within the approximating range of 350.0° F. to 450.0° F. In order to maximize the effect of maintaining the crispness of fried potatoes 10, the heated air should be substantially moisture-free.

By maintaining open volume space 18, a maximum of excessive lipids or fats are extracted from foodstuffs 10 by providing impingement of non-recirculating heated air. Where there is a closed volume, heated air would recirculate through the foodstuffs 10 and would substantially lower the amount of the lipids or fats which are vaporized and removed by the present process.

The subject method as hereinbefore described provides for an open hot air system for final preparation of french fried potatoes and other fried foodstuffs which have previously had oil or fat applied thereto. The method directs itself to the extraction of excessive amounts of oil from the surface of foodstuffs which have been previously prepared in cooking oil.

Through the removal of excess fat in french fried potatoes, substantially lower cholesterol levels were achieved. Typical french fried potatoes sold commercially contain approximately 47.0% fat calories and raise blood cholesterol levels to approximately 250 ml/dl. Through use of the hereinbefore described method wherein the impingement of the foodstuffs by the heated air is the final step in the cooking process, it has been found that french fried potatoes contain approximately 23.0% fat calories, which is compatible with the blood cholesterol level of 180 mg/dl.

In the best prior art preparation of french fried potatoes known to the inventor which are specifically designed to lower the lipids from foodstuffs as shown in U.S. Pat. No. 4,269,861, the french fried foodstuffs are partially cooked and processed specifically to reduce their lipid content and through independent testing have been found to have a final cooked fat content approximating 16.0%. When these french fries were prepared by the method concept as herein described, namely, providing the heated air as the final step in the cooking process, the final cooked product was found to have approximately a 9.0% fat content.

Thus, it has been found that the lipid content reduction in the final cooked product utilizing the subject method produced a reduction in the overall lipid content of the foodstuffs in the approximating range between 44.0–51.0% independent of whether the commercially prepared french fries or the specifically reduced lipid content process was utilized.

Although this invention has been described in connection with specific form and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of extracting lipids from previously oil fried foodstuffs to derive a final food product having a final lipid content approximately 9%, consisting essentially of the following steps:
   (a) impinging said previously oil fried foodstuffs with a stream of heated air, said previously oil fried foods stuffs being maintained in an open volume space; and,
   (b) removing said heated air from said open volume space containing said foodstuffs subsequent to impingement by said heated air; said impingement by said heated air being the final step in a cooking process.

2. The method of extracting lipids as recited in claim 1 where the step of impinging is preceded by the step of frying or blanching said foodstuffs in cooking oil.

3. The method of extracting lipids as recited in claim 2 where the step of impinging is preceded by the step of heating said air to a temperature greater than the boiling point of said lipids.

4. The method of extracting lipids as recited in claim 3 where said heated air is substantially moisture free.

5. The method of extracting lipids are recited in claim 3 where the step of heating includes the step of establishing said heated air at a predetermined temperature within an approximating range of between 350.0° F.–450.0° F.

6. The method of extracting lipids as recited in claim 3 where the step of impinging includes the step of blowing said heated air into contact with said foodstuffs.

7. The method of extracting lipids as recited in claim 1 where the step of impinging is preceded by the step of deep fat frying said foodstuffs.

8. The method of extracting lipids as recited in claim 1 where said oil fried foodstuffs include potato strips.

9. A method of maintinaing crispness of initially prepared french fried potatoes to derive a final food product having a final lipid content approximating 9% consisting essentially of the following steps:
   (a) completing the cooking process of said initially prepared french fried potatoes;
   (b) placing said cooked french fried potatoes on a base surface;
   (c) impinging said cooked french fried potatoes with a stream of non-recirculating heated air in an open volume air flow system, and,
   (d) removing said heated air from said open volume air flow system; said impingement of said cooked french fried potatoes by said stream of heated air being the final step of said french fry preparation.

10. The method of maintaining crispness as recited in claim 9 where the step of at least partially cooking includes the step of frying said potato strips in cooking oil.

11. The method of maintaining crispness as recited in claim 10 where the step of frying said potato strips includes the step of deep fat frying said potato strips in said cooking oil.

12. The method of maintaining crispness as recited in claim 10 where the step of frying said potato strips includes the step of blanching said potato strips in said cooking oil.

13. The method of maintaining crispness as recited in claim 9 where said step of impinging includes the step of contacting said at least partially cooked potato strips with a substantially continuous stream of said heated air.

14. The method of maintaining crispness as recited in claim 13 where the step of impinging is preceded by the step of heating said air to a temperature greater than the boiling point of lipids contained in said at least partially cooked potato strips.

15. The method of maintaining crispness as recited in claim 13 where the step of impinging is preceded by the step of heating said air to a predetermined temperature within an approximating range of between 350.0° F.–450.0° F.

16. The method of maintaining crispness as recited in claim 15 where said heated air is substantially moisture free.

17. The method of maintaining crispness as recited in claim 9 where the step of impinging includes the step of blowing said heated air into contact with said at least partially cooked potato strips.

* * * * *